May 4, 1937.  M. DE LIN  2,079,157
CIRCULATION CONTROL FOR FURNACES
Filed Oct. 7, 1935  2 Sheets—Sheet 1

Inventor
Martin DeLin
Attorneys

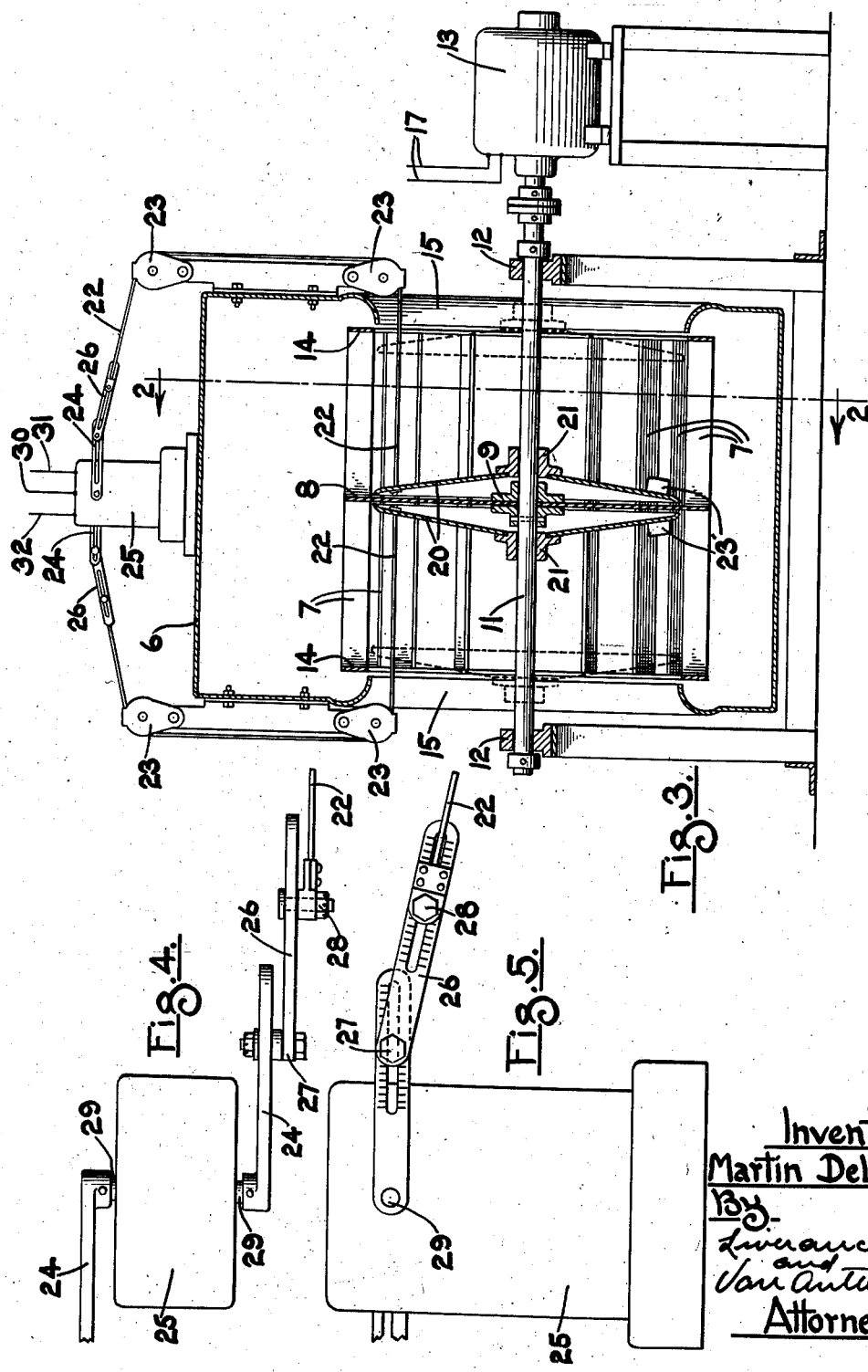

Patented May 4, 1937

2,079,157

UNITED STATES PATENT OFFICE 2,079,157

CIRCULATION CONTROL FOR FURNACES

Martin De Lin, Holland, Mich., assignor to Holland Furnace Company, Holland, Mich., a corporation of Michigan Application October 7, 1935, Serial No. 43,824

2 Claims. (Cl. 237—2)

This invention relates to improvements in circulating systems and controls for furnaces. The invention relates more specifically to the mechanism and system for circulating air in a warm air heating system although it may be adapted to the circulation of other heating mediums such as hot water.

The warm air heating system embodying this invention includes a furnace, means for conveying heated air from the furnace to the room to be heated and for returning air from the room to the furnace with a fan to induce air circulation. The fan has means for varying its delivery capacity and the system includes thermostatic control means for stopping and starting operation of the fan with relation to the heat of the furnace body and for varying the delivery capacity of the fan relative to the heat in the room.

By use of this invention the fan is caused to operate continuously at all times when the heat within the furnace jacket is above a predetermined point, the fan being stopped and inoperative when the furnace heat is below said point.

Operation of the fan continuously at uniform speed during the time when the furnace is sufficiently warm to give off heat to an appreciable extent and controlling the amount of air circulated with relation to the heat of a room by means of the variable delivery capacity control of the fan has several advantages. A constant speed motor may be used to drive the fan which is considerably cheaper and more simple than a variable speed motor or if the fan were to be driven at varying speeds by a constant speed motor variable speed transmission devices would be required which are eliminated by the present invention. Furthermore, the output of the fan may be more accurately controlled while running at a constant speed by the use of the capacity control device than by varying the speed of fan rotation and also it is possible to have the most effective rotation speed accurately determined by engineers at the factory and the output of the fan varied by the capacity control device at the installation by a less experienced operator.

The invention also embodies a specific means for controlling the delivery capacity of the fan which operates most effectively and quietly and obviates whistling noises which are the objectionable result of some other types of fan capacity control mechanisms.

The invention provides various new and useful features of construction and arrangement hereinafter more fully described and particularly pointed out in the claims, reference being had to the accompanying drawings, in which, Fig. 1 is a diagrammatic elevation of a heating system embodying this invention.

Fig. 3 is a sectional elevation of the fan and capacity control device taken on the line 3—3 of Fig. 2.

Fig. 4 is a plan view of the control motor, and Fig. 5 is an elevation of the same.

Like numbers refer to like parts in all of the figures.

Figure 1:
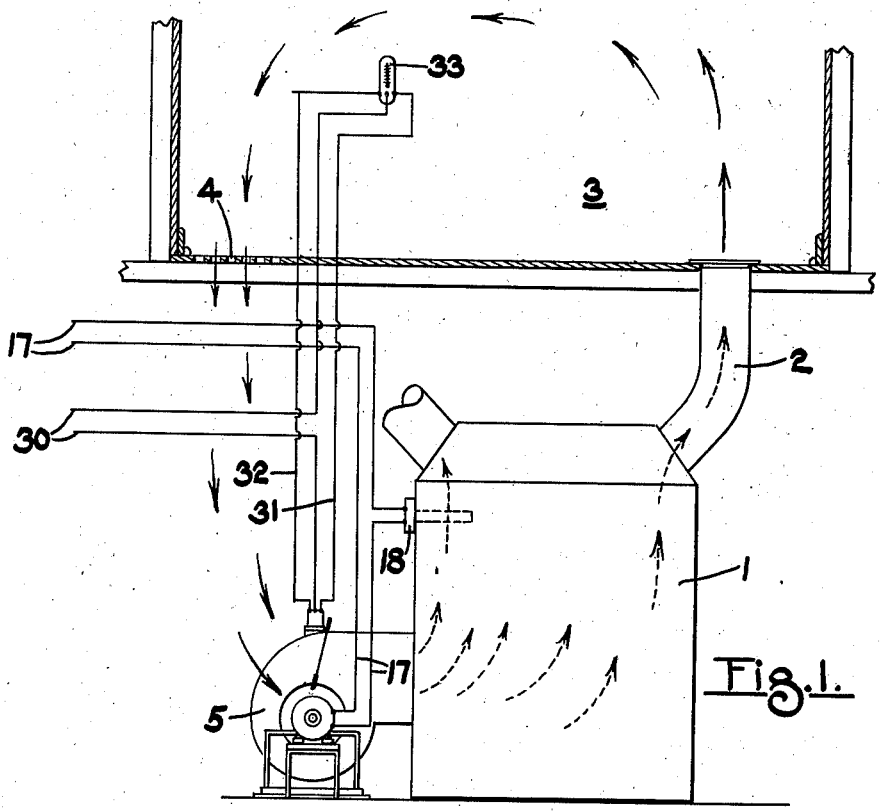
Figure 2:
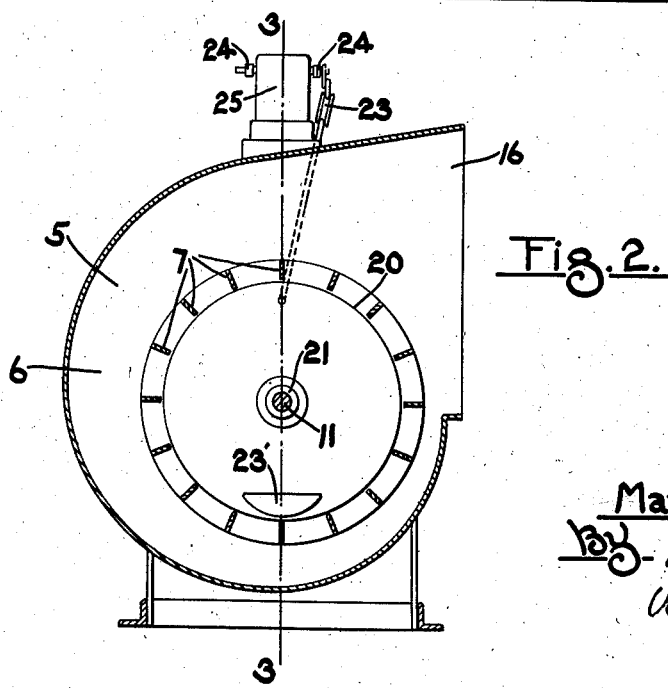
Figure 2 is an enlarged sectional elevation of a fan with the output control mechanism of this invention applied thereto taken on the line 2—2 of Fig. 3.

1 represents a conventional warm air furnace through the jacket of which air circulates to be heated and 2 is a warm air conduit leading from the furnace jacket to a room 3 to be heated. A return air passage 4 is provided in the floor of the room 3 through which air may circulate from the room back to the vicinity of the furnace and a fan 5 is provided to forcibly circulate the air through the jacket of the furnace into the room 3.

The fan is of the centrifugal type having a casing 6 and a rotor 7 of the so-called "squirrel cage" type. The fan shown has a double rotor provided with a central disk 8 having a hub 9 which is fixed to a shaft 11 mounted in bearings 12 and driven by an electric motor 13.

The rotor blades 7 extend in opposite directions from the disk 8 and have their respective ends fixed to rings 14 which complete the rotor construction. The casing 6 has air inlet openings 15 surrounding the shaft 11 and of substantially the same diameter as the inner diameter of the rotor within the blades 7 and an outlet or delivery opening 16 and in its rotation air is thrown outwardly from the rotor blades 7 by centrifugal force passing out through the opening 16 and is replaced by air entering through the inlet openings 15.

The fan motor 13 is actuated by an electric circuit carried by the conductors 17 in which is a so-called thermostatic limit switch 18 subjected to the heat within the jacket of the furnace 1 and adjusted to break the circuit in the electric conductors when the temperature in said jacket falls below a predetermined degree, for example, 100° F. and to close the circuit when the heat in the jacket is above that degree. Thus at all times when the heat within the furnace jacket is sufficiently high to have any appreciable effect on heating the room the fan rotor is caused to continuously rotate.

The delivery capacity of the fan is varied by means of the sliding disks 20. Because of the fact that the fan shown in the drawings is of double style, that is, extending both sides from the center disk 8, a disk 20 is provided on each side of the disk 8 and each disk controls the delivery of its respective part of the fan rotor. The invention would be as fully embodied in a single style rotor having one control disk only.

The disks 20 are provided with hubs 21 freely mounted upon the shaft 11 for both rotating and sliding movement. The disks 20 are of substantially the same diameter as the inner diameter of the rotor and may be slightly conical as shown and their edges are preferably curved inwardly which is in a direction away from the flow of air entering the rotor.

The disks may be slid longitudinally of the shaft from the positions adjacent the central disk 8 as shown in full lines in Fig. 3 to extreme opposite positions adjacent the inlets 15 of the fan housing and serve to control the effective area of the rotor blades 7. When the disks 20 are in their innermost positions the rotor is fully effective and delivers its maximum capacity of air. Movement of the disks outwardly prevents the flow of incoming air against the blades in varying degrees from maximum to zero depending upon the extent to which the disks are moved. In other words, the disks serve as an effective guide for the incoming air against the rotor blades 7 and determine, by their positions, the lengths of the blades which will effectively operate to circulate the air and thereby control the delivery capacity of the fan.

The disks 20 are non-rotative for the purpose of effecting automatic adjustment thereof during operation of the fan and inasmuch as their hubs 21 are freely rotative on the shaft 11 the disks may be held from rotation by a slight impedance such as cables 22 connected thereto and if desired weights 23' may also be attached to the disks near their periphery which also tend to prevent rotation thereof.

The incoming air current induced by expelling air from the periphery of the rotor by reason of centrifugal force is sufficient to normally move the disks 20 to their innermost positions adjacent the rotor disk 8 and the cables 22 serve to move the disks outwardly to reduce the delivery capacity of the fan. The cables 22, one attached to each disk 20, extend outwardly through the open ends of the rotor and through the inlet passages 15 of the fan housing and thence pass over pulleys 23 and are respectively connected to the cranks 24 of the control motor 25. The means of attachment of the cables 22 consist of links 26 pivotally attached at 27 to the cranks 24 and adjustable radially of the axis of said cranks and adjustable connections 28 by means of which the cables 22 are connected to and adjustable longitudinally of the links 26.

The control motor 25 is a device commonly known in the art as a "furnace damper control motor" and it is so constructed that when it is actuated by an electric current its shaft 29 will rotate one-half revolution and stop. The current to operate the control motor 25 is carried by electric conductors 30, 31 and 32 and these conductors are in circuit with a room thermostatic switch 33 located in the room 3 to be heated and the current to the control motor is controlled by said thermostatic switch 33 so that the motor shaft 29 is rotated to one position when the room temperature is below a predetermined degree and is rotated 180° therefrom when the room temperature is above said predetermined degree.

Rotation of the motor shaft 29 actuates the control disks 20 through the cranks 24 attached to said shaft and the cables 22 adjustably connected thereto so that the disks are free to move inwardly for greater fan capacity when the motor is rotated to position for cool room temperature and are moved outwardly for decreased fan capacity when the motor is moved to position for warm room temperature. The adjustable connections of the cables 22 to the cranks 24 permit the positions of the control disks 20 to be adjusted so that they will be moved, by actuation of the control motor 25, from extreme inner position to extreme outer position and vice versa or from any intermediate positions thereby making it possible to cause the fan to deliver the maximum air capacity into the air circulating system when the room temperature is cool and to run substantially idle with no air delivery when the room temperature is warm or to deliver only part of its maximum capacity when the room temperature is cool and/or to continue to deliver a small part of its capacity when the room temperature is warm.

The curved peripheral edges of the disks 20 permit an easy flow of air past them and minimize the noise incidental to the rush of air through the fan and especially when the air flow is restricted by means of said disks.

*Operation*

By means of this invention it will be seen that the air circulation is entirely automatically controlled after the device is adjusted to meet the existing conditions. When the heat within the furnace jacket is below a predetermined degree, such as during warm weather when there is no fire in the furnace or during mild weather when the furnace fire is low or for other reasons, the limit switch 18 breaks the circuit in the conductor 17 of the fan motor 13 and the fan does not operate. At all times when the heat in the furnace jacket is above a predetermined degree and sufficiently warm to appreciably heat the room the limit switch 18 closes the electrical circuit to the fan motor and the fan continuously operates at a uniform speed which is most effective for proper operation.

During operation of the fan its delivery capacity is automatically controlled with relation to the temperature in the room 3 and the requirement for heated air to be delivered thereto. If the room temperature is cool the room thermostat 33 closes an electric circuit through the conductors 30, 31 and 32 to operate the control motor 25 to a position which permits the control disks 20 to move to increase the delivery capacity of the fan. When the room temperature is warm the thermostat 33 directs an electric current to operate the control motor 25 to a position to move the control disks 20 outwardly to reduce the delivery capacity of the fan.

The continuously rotating fan rotor makes it possible to circulate air through the furnace jacket and heating system at all times so that when the room is warm a reduced flow of air may be had with the result of preventing overheating of the furnace body and maintaining a warm temperature in the room.

It is conceived that the invention may be modified to circulate other heating mediums than air. For example, in a hot water heating system a water circulator having means for varying its delivery capacity may be substituted for the fan and its delivery capacity controlled and this water circulator and the capacity control may be actuated and controlled in the same manner as herein described for the fan. It is also conceived that other types of fans or air circulating devices may be used in substitution for the centrifugal fan herein disclosed and that other specific means for controlling the delivery capacity may be substituted either in the centrifugal type of fan or in other types of fan all within the spirit of this invention.

The invention is defined in the appended claims and is to be considered comprehensive of all forms of structure coming within their scope.

I claim:

1. A heating circulating system comprising, a heater, a circulating system for conducting a heating medium from said heater to a space to be heated, means for inducing circulation of said heating medium in said circulating system, means for automatically causing operation or cessation of said circulation inducing means when said heater is above or below, respectively, a predetermined temperature and means for automatically varying the delivery capacity of said circulation inducing means responsive to temperature changes in the space to be heated.

2. A heating circulating system comprising, a warm air heating furnace, means to conduct heated air from said furnace to a space to be heated, a fan to circulate air from said furnace to said space, automatic means for causing continuous and constant speed operation of said fan at all times when the heat of said furnace is above a predetermined degree and cessation of operation below said predetermined degree, means for varying the delivery capacity of said fan, said means being variable during the operation of said fan and electric means controlled by the temperature in said space to actuated said means for varying the delivery capacity.

MARTIN DE LIN.